United States Patent
Boloorian et al.

(10) Patent No.: US 12,535,586 B2
(45) Date of Patent: Jan. 27, 2026

(54) REDUCTION OF ADC SAMPLING RATES IN LIDAR SYSTEMS

(71) Applicant: SiLC Technologies, Inc., Monrovia, CA (US)

(72) Inventors: Majid Boloorian, San Diego, CA (US); Dazeng Feng, El Monte, CA (US); Mehdi Asghari, La Canada Flintridge, CA (US)

(73) Assignee: SiLC Technology, Inc., Monrovia, CA (US)

( * ) Notice: Subject to any disclaimer, the term of this patent is extended or adjusted under 35 U.S.C. 154(b) by 0 days.

(21) Appl. No.: 16/395,128

(22) Filed: Apr. 25, 2019

(65) Prior Publication Data

US 2020/0072979 A1 Mar. 5, 2020

Related U.S. Application Data

(60) Provisional application No. 62/726,101, filed on Aug. 31, 2018.

(51) Int. Cl.
   *G01S 17/00* (2020.01)
   *G01S 7/4911* (2020.01)
   (Continued)

(52) U.S. Cl.
   CPC ............ *G01S 17/58* (2013.01); *G01S 7/4911* (2013.01); *G01S 7/4913* (2013.01); *G01S 7/4915* (2013.01); *G01S 17/32* (2013.01)

(58) Field of Classification Search
   USPC ...................................................... 356/5.01
   See application file for complete search history.

(56) References Cited

U.S. PATENT DOCUMENTS

| 4,168,906 A | 9/1979 | Schwiesow |
| 4,262,993 A | 4/1981 | Burns et al. |

(Continued)

FOREIGN PATENT DOCUMENTS

| CN | 1668939 A | 9/2005 |
| CN | 101356450 A | 1/2009 |

(Continued)

OTHER PUBLICATIONS

Kang, Sung Chul, International Search Report and Written Opinion, PCT/US2019/043828, Korean Intellectual Property Office, Nov. 15, 2019.

(Continued)

*Primary Examiner* — James R Hulka
(74) *Attorney, Agent, or Firm* — Gavrilovich, Dodd & Lindsey LLP

(57) ABSTRACT

A LIDAR system includes a LIDAR chip that is configured to output a LIDAR output signal such that the LIDAR output signal can be reflected by an object located off the LIDAR chip. The LIDAR chip is also configured to receive a LIDAR input signal that includes light from the reflected LIDAR output signal. The LIDAR chip is configured to combine the LIDAR input signal with a reference signal so as to produce a beating signal. The electronics operate the LIDAR chip such that the effects of radial velocity between the reflecting object are reduced or removed from the beating signal while measuring the distance between the LIDAR chip and the reflecting object. The electronics operate the LIDAR chip such that the effects of the distance between the reflecting object are reduced or removed from the beating signal while measuring the radial velocity between the LIDAR chip and the reflecting object.

20 Claims, 5 Drawing Sheets

(51) Int. Cl.
    *G01S 7/4913*    (2020.01)
    *G01S 7/4915*    (2020.01)
    *G01S 17/32*     (2020.01)
    *G01S 17/58*     (2006.01)

(56) References Cited

U.S. PATENT DOCUMENTS

| | | |
|---|---|---|
| 4,472,020 A | 9/1984 | Evanchuk |
| 4,523,803 A | 6/1985 | Arao et al. |
| 4,786,132 A | 11/1988 | Gordon |
| 4,845,703 A | 7/1989 | Suzuki |
| 4,914,665 A | 4/1990 | Sorin |
| 4,955,028 A | 9/1990 | Alfeness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,305,412 A | 4/1994 | Paoli |
| 5,323,223 A | 6/1994 | Hayes |
| 5,396,328 A | 3/1995 | Jestel et al. |
| 5,500,910 A | 3/1996 | Boudreau et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,959,133 B2 | 10/2005 | Vancoill et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,345,497 B2 | 7/2019 | Wu et al. |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,649,306 B2 | 5/2020 | Skirlo et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 10,962,713 B2 | 3/2021 | Lee |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 * | 7/2022 | Boloorian ............... G01S 17/34 |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 * | 12/2022 | Asghari ............ G02B 6/12009 |
| 11,579,300 B1 | 2/2023 | Li |
| 11,635,491 B2 | 4/2023 | Asghari et al. |
| 11,714,167 B2 | 8/2023 | Feng et al. |
| 11,768,419 B1 | 9/2023 | Schroder et al. |
| 11,815,720 B1 | 11/2023 | Tavallaee et al. |
| 11,860,304 B2 | 1/2024 | Ren et al. |
| 11,908,075 B2 | 2/2024 | Gorantla |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0183603 A1 | 10/2003 | Forsman et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0213103 A1 | 9/2005 | Everett et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2006/0232763 A1 | 10/2006 | Jokinen |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |

(56) References Cited

U.S. PATENT DOCUMENTS

| | | |
|---|---|---|
| 2009/0279070 A1 | 11/2009 | Ueno |
| 2009/0309782 A1 | 12/2009 | Takabayashi et al. |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1* | 7/2012 | Asahara .............. G01S 17/95 356/73 |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1* | 12/2016 | Lardin .............. H01S 5/0622 356/5.09 |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0002432 A1 | 1/2018 | Gilliland et al. |
| 2018/0003805 A1* | 1/2018 | Popovich .............. G06F 3/013 |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0348343 A1 | 12/2018 | Achour et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1 | 1/2019 | Imaki et al. |
| 2019/0018197 A1 | 1/2019 | Boutami et al. |
| 2019/0025094 A1 | 1/2019 | Lewis et al. |

(56) References Cited

U.S. PATENT DOCUMENTS

| | | |
|---|---|---|
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1* | 3/2019 | Dussan ............... G01S 7/4817 |
| 2019/0086518 A1 | 3/2019 | Halstig et al. |
| 2019/0086550 A1* | 3/2019 | Dussan ............... G01S 7/4861 |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1* | 6/2019 | Tong ............... G01S 13/865 |
| 2019/0204419 A1 | 7/2019 | Baba et al. |
| 2019/0204441 A1* | 7/2019 | Feneyrou ............... G01S 17/34 |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0266741 A1 | 8/2019 | Uehara |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1* | 11/2019 | Boloorian ............... G01S 17/34 |
| 2019/0353977 A1 | 11/2019 | Hung |
| 2019/0361122 A1 | 11/2019 | Crouch et al. |
| 2019/0369244 A1* | 12/2019 | Asghari ............... H01S 5/0085 |
| 2019/0369251 A1* | 12/2019 | Feng ............... G01S 17/36 |
| 2019/0372307 A1 | 12/2019 | Morton |
| 2019/0383907 A1 | 12/2019 | Belsley et al. |
| 2019/0391242 A1* | 12/2019 | Asghari ............ G02B 26/0833 |
| 2019/0391243 A1 | 12/2019 | Nicolaescu |
| 2020/0018857 A1* | 1/2020 | Feng ............... G01S 7/4917 |
| 2020/0021082 A1 | 1/2020 | Rakuljic |
| 2020/0025898 A1 | 1/2020 | Ain-Kedem et al. |
| 2020/0025926 A1* | 1/2020 | Asghari ............... G01S 7/4813 |
| 2020/0043176 A1 | 2/2020 | Maila et al. |
| 2020/0049799 A1 | 2/2020 | Ando et al. |
| 2020/0057143 A1* | 2/2020 | Asghari ............... G01S 17/58 |
| 2020/0064116 A1 | 2/2020 | Salvade et al. |
| 2020/0064477 A1 | 2/2020 | Komatsuzaki |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0116863 A1 | 4/2020 | Jensen et al. |
| 2020/0132843 A1 | 4/2020 | Hart et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0379115 A1 | 12/2020 | Yang et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132322 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1 | 6/2021 | Golikov et al. |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0364607 A1 | 11/2021 | Davydenko |
| 2021/0373162 A1 | 12/2021 | Wu et al. |
| 2021/0389244 A1 | 12/2021 | Bowman et al. |
| 2021/0396879 A1 | 12/2021 | Sun et al. |

(56) References Cited

U.S. PATENT DOCUMENTS

| | | |
|---|---|---|
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113390 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0283389 A1 | 9/2022 | Yang et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0373739 A1 | 11/2022 | Abril et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |
| 2023/0296732 A1 | 9/2023 | Xiao |
| 2024/0012112 A1 | 1/2024 | Warke et al. |
| 2024/0012147 A1 | 1/2024 | Tavallaee et al. |
| 2025/0085401 A1 | 3/2025 | Zhou et al. |
| 2025/0094380 A1 | 3/2025 | Mazed |

FOREIGN PATENT DOCUMENTS

| | | |
|---|---|---|
| CN | 103874945 A | 6/2014 |
| CN | 104459881 A | 3/2015 |
| CN | 204479750 U | 7/2015 |
| CN | 105589074 A | 5/2016 |
| CN | 105680320 A | 6/2016 |
| CN | 105917257 A | 8/2016 |
| CN | 106154248 A | 11/2016 |
| CN | 106410607 A | 2/2017 |
| CN | 106773028 A | 5/2017 |
| CN | 106842232 A | 6/2017 |
| CN | 106959439 A | 7/2017 |
| CN | 107144847 A | 9/2017 |
| CN | 107305184 A | 10/2017 |
| CN | 107367734 A | 11/2017 |
| CN | 107976666 A | 5/2018 |
| CN | 108139465 A | 6/2018 |
| CN | 108291970 A | 7/2018 |
| CN | 108603758 A | 9/2018 |
| CN | 109254296 A | 1/2019 |
| CN | 109471129 A | 3/2019 |
| CN | 109642952 A | 4/2019 |
| CN | 110036276 A | 7/2019 |
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| CN | 114419152 A | 4/2022 |
| CN | 110764074 B | 6/2022 |
| DE | 10 2015 222061 A1 | 5/2017 |
| DE | 10 2017 200795 A1 | 7/2018 |
| DE | 10 2017 106 226 A1 | 9/2018 |
| DE | 102019124598 A1 | 3/2020 |
| EP | 0 523 921 A1 | 1/1993 |
| EP | 2796890 A1 | 10/2014 |
| EP | 2955542 B1 | 4/2017 |
| EP | 3276371 A1 | 1/2018 |
| EP | 3339924 A1 | 6/2018 |
| EP | 3259615 B1 | 11/2019 |
| EP | 3719537 A1 | 10/2020 |
| EP | 3 584 893 B1 | 6/2021 |
| EP | 3889644 A1 | 10/2021 |
| GB | 1 585 053 A | 2/1981 |
| GB | 2173664 A | 10/1986 |
| GB | 2586499 A | 2/2021 |
| JP | S53-123004 A | 10/1978 |
| JP | H05-158096 A | 6/1993 |
| JP | H09-33872 A | 2/1997 |
| JP | H1010227 A | 1/1998 |
| JP | 2003224321 A | 8/2003 |
| JP | 2004-151022 A | 5/2004 |
| JP | 2007184511 A | 7/2007 |
| JP | 2008160130 A | 7/2008 |
| JP | 2008292370 A | 12/2008 |
| JP | 2009-115696 A | 5/2009 |
| JP | 2010151806 A | 7/2010 |
| JP | 2010271624 A | 12/2010 |
| JP | 2012146787 A | 8/2012 |
| JP | 2013165407 A | 8/2013 |
| JP | 2014202716 A | 10/2014 |
| JP | 2015-018640 A | 1/2015 |
| JP | 2015092184 A | 5/2015 |
| JP | 2015-517094 A | 6/2015 |
| JP | 2015172540 A | 10/2015 |
| JP | 2015180735 A | 10/2015 |
| JP | 2015230259 A | 12/2015 |
| JP | 2016111087 A | 6/2016 |
| JP | 5975203 B2 | 8/2016 |
| JP | 2017502315 A | 1/2017 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018511054 A | 4/2018 |
| JP | 2018-512600 A | 5/2018 |
| JP | 2018520346 A | 7/2018 |
| JP | 2018529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019525195 A | 9/2019 |
| JP | 2019-203977 A | 11/2019 |
| JP | 2019-537012 A | 12/2019 |
| JP | 2020-012641 A | 1/2020 |
| JP | 2020-16639 A | 1/2020 |
| JP | 2020-34546 A | 3/2020 |
| JP | 2002090457 A | 3/2020 |
| JP | 2020085723 A | 6/2020 |
| JP | 2021004800 A | 1/2021 |
| JP | 2021032848 A | 3/2021 |
| JP | 7397009 B2 | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2013/049579 A1 | 4/2013 |
| WO | 2014 203654 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |

(56) References Cited

FOREIGN PATENT DOCUMENTS

| | | |
|---|---|---|
| WO | 2016/024332 A1 | 2/2016 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017/102156 A1 | 6/2017 |
| WO | 2017/187510 A1 | 11/2017 |
| WO | 2017/216581 A1 | 12/2017 |
| WO | 2018/003852 A1 | 1/2018 |
| WO | WO-2018036946 A1 * | 3/2018 ............. G01S 17/58 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/167515 A1 | 8/2020 |
| WO | 2020/205450 A1 | 10/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/006470 A1 | 2/2023 |
| WO | 2023/118295 A1 | 6/2023 |

OTHER PUBLICATIONS

Pierrottet et al., "Linear FMCW Laser Radar for Precision Range and Vector Velocity Measurements", MRS Online Proceeding Library Archive, Jan. 2008, pp. 1-9.

Wang et al., "Automotive FMCW Radar-enhanced Range Estimation via a Local Resampling Fourier Transform", International Journal of Advanced Robotic Systems, 2016, pp. 1-8.

Wojtkiewicz et al., "Two-dimensional signal processing in FMCW radars", National Conference on Circuit Theory and Electronic Networks, vol. 2, Oct. 1997, pp. 1-6.

Wittmann-Regis, Agnes, International Preliminary Report on Patentability and Written Opinion, PCT/US2019/043828, The International Bureau of WIPO, Mar. 11, 2021.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, July/Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three- Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Zhu et al., "Dual-Comb Ranging", Engineering, 4, Oct. 16, 2018, pp. 772-778.

Aalto, Timo et al., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

Amzajerdian et al., "Demonstration of Coherent Doppler Lidar for Navigation in GPS-Denied Environments", Laser Radar Technology and Applications Xxii, Spie Defense and Security, Apr. 9-13, 2017, vol. 10191, 1019102.

Anderson et al., "ladar: Frequency-Modulated Continuous Wave Laser Detection AND Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Chang et al., "A review of UAV autonomous navigation in GPS-denied environments", Robots and Autonomous Systems, Dec. 2023, 170, 104533, 23 pages.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29 - May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

(56) References Cited

OTHER PUBLICATIONS

Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, Tx, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP Apd", IEEE Photonics Technology Letters, Mar. 15, 2015, vol. 27, No. 6, pp. 616-719.
Lu, Z., "Silicon Photonic Switches for Optical Communication Applications", PhD Thesis. University of British Columbia, Sep. 29, 2017, 165 pages.
Nevlacsil et al., "Multi-channel swept source optical coherence tomography concept based on photonic integrated circuits", Optics Express, Oct. 26, 2020, vol. 28, No. 22, p. 32468-32482.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from Pi USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. Msc Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "Lidar—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9 (19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al., "Precise control of broadband frequency chirps using optoelectronic feedback," Optics Express, Aug. 31, 2009, vol. 17, No. 18, p. 15991-15999.
Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Smit, Meint K. C. v., "Phasar-Based WDM-Devices: Principles, Design and Applications", IEEE Journal of Selected Topics in Quantum Electronics, Jan. 1, 1996, 2(2), 236-250.
Soref, Richard A. et al. "Electrooptical Effects in Silicon", IEEE Journal of Quantum Electronics, vol. QE-23, No. 1, Jan. 1987, pp. 123-129.

\* cited by examiner

Displacement of the signal components by the frequency shift (top: maximum frequency shift, bottom: minimum frequency shift)

REDUCTION OF ADC SAMPLING RATES IN LIDAR SYSTEMS

RELATED APPLICATIONS

This application claims the benefit of U.S. Provisional Patent Application Ser. No. 62/726,101, filed on Aug. 31, 2018, entitled "Optical Sensor System," and incorporated herein in its entirety.

FIELD

The invention relates to optical devices. In particular, the invention relates to LIDAR chips.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) systems are used to construct a 3D image of a target scene by illuminating the scene with laser light and measuring the returned signal.

Many LIDAR approaches transmit a light signal (a LIDAR output signal) from a LIDAR chip. The LIDAR output signal is reflected off of an object and a portion of the reflected light signal returns to the LIDAR chip as a LIDAR input signal. The LIDAR input signal is processed by the LIDAR chip and/or associated electronics so as to determine the distance of the reflecting object from the LIDAR chip and/or the radial velocity of the object and the LIDAR chip. Because the LIDAR input signal is generally an analog signal but the processing is performed on digital signals, the LIDAR system often includes one or more an Analog-to-Digital Converters (ADC) for converting a light signal that includes light from the LIDAR input signal to a digital signal. In many LIDAR applications, the sample rate that would be required by these Analog-to-Digital Converters (ADC) are so high that commercialization would be impractical and/or undesirably expensive.

For the above, reasons there is a need for a LIDAR system that uses practical ADC sampling rates.

SUMMARY

A LIDAR system includes a LIDAR chip that is configured to output a LIDAR output signal such that the LIDAR output signal can be reflected by an object located off the LIDAR chip. The LIDAR chip is also configured to receive a LIDAR input signal that includes light from the reflected LIDAR output signal. The LIDAR chip is configured to combine the LIDAR input signal with a reference signal so as to produce a beating signal. The electronics operate the LIDAR chip such that the effects of radial velocity between the reflecting object are reduced or removed from the beating signal while measuring the distance between the LIDAR chip and the reflecting object. The electronics operate the LIDAR chip such that the effects of the distance between the reflecting object are reduced or removed from the beating signal while measuring the radial velocity between the LIDAR chip and the reflecting object.

An embodiment of a LIDAR system includes a LIDAR chip configured to output a LIDAR output signal such that the LIDAR output signal can be reflected by an object located off the LIDAR chip. The LIDAR chip is also configured to receive a LIDAR input signal that includes light from the reflected LIDAR output signal. The system also includes electronics configured to operate the LIDAR chip. The electronics generate the LIDAR output signal such that when there is radial velocity between the LIDAR chip and the reflecting object the LIDAR input signal has a frequency shift relative to a frequency of the LIDAR output signal but a contribution of the relative motion to the frequency shift is less than 10% of the Doppler shift from two objects moving at the same radial velocity with one of the objects transmitting a continuous wave signal at a frequency of the LIDAR output signal.

An embodiment of a LIDAR system includes a LIDAR chip configured to output a LIDAR output signal such that the LIDAR output signal can be reflected by an object located off the LIDAR chip. The LIDAR chip is also configured to receive a LIDAR input signal that includes light from the reflected LIDAR output signal. The system also includes electronics configured to operate the LIDAR chip. The electronics generate the LIDAR output signal such that when there is radial velocity between the LIDAR chip and the reflecting object the LIDAR input signal has a frequency shift relative to a frequency of the LIDAR output signal but the frequency shift is not a function of the radial velocity between the LIDAR chip and the reflecting object.

An embodiment of a LIDAR system includes a LIDAR chip configured to output a LIDAR output signal such that the LIDAR output signal can be reflected by an object located off the LIDAR chip. The LIDAR chip is also configured to receive a LIDAR input signal that includes light from the reflected LIDAR output signal. The system also includes electronics configured to operate the LIDAR chip. The electronics determine a radial velocity between the LIDAR chip and the reflecting object and a distance between the LIDAR chip and the reflecting object. The electronics generate the LIDAR output signal as a continuous wave and use the LIDAR input signal that results from the continuous wave to determine the radial velocity between the LIDAR chip and the reflecting object.

An embodiment of a LIDAR system includes a LIDAR chip configured to output a LIDAR output signal such that the LIDAR output signal can be reflected by an object located off the LIDAR chip. The LIDAR chip is also configured to receive a LIDAR input signal that includes light from the reflected LIDAR output signal. The system also includes electronics configured to operate the LIDAR chip. The electronics operate the LIDAR chip so as to generate LIDAR data in a series of cycles. In some instances, each cycle corresponds to a different sample region in a field of view. As a result, the LIDAR data generated in different cycles can be generated for different sample regions in the field of view.

Each cycle includes at least a velocity period and a distance period and can include additional periods. The velocity period can be before the distance period in the same cycle or the velocity period can be performed before the distance period in the same cycle. In some instances, the electronics use the LIDAR input signal generated during the velocity period to approximate a relative velocity between the LIDAR chip and the reflecting object but do not use the LIDAR input signal generated during the velocity period to approximate a distance between the LIDAR chip and the reflecting object; and/or the electronics use the LIDAR input signal generated during the distance period to approximate the distance between the LIDAR chip and the reflecting object but do not use the LIDAR input signal generated during the distance period to approximate a radial velocity between the LIDAR chip and the reflecting object.

Another version of a LIDAR system includes a LIDAR chip configured to output a LIDAR output signal such that the LIDAR output signal can be reflected by an object located off the LIDAR chip. The LIDAR chip is also configured to receive a LIDAR input signal that includes light from the reflected LIDAR output signal. The system also includes electronics configured that operate the LIDAR chip. The electronics are configured to generate the LIDAR output signal such that a contribution of radial velocity between the LIDAR chip and the object to a frequency shift between the LIDAR input signal and the LIDAR output signal is less than 10%, 1%, 0.1%, 0.01%, or even 0.001% of what the contribution to the frequency shift would be with LIDAR output signal replaced by a continuous wave with the same frequency as the LIDAR output signal.

DESCRIPTION

Figure 1:
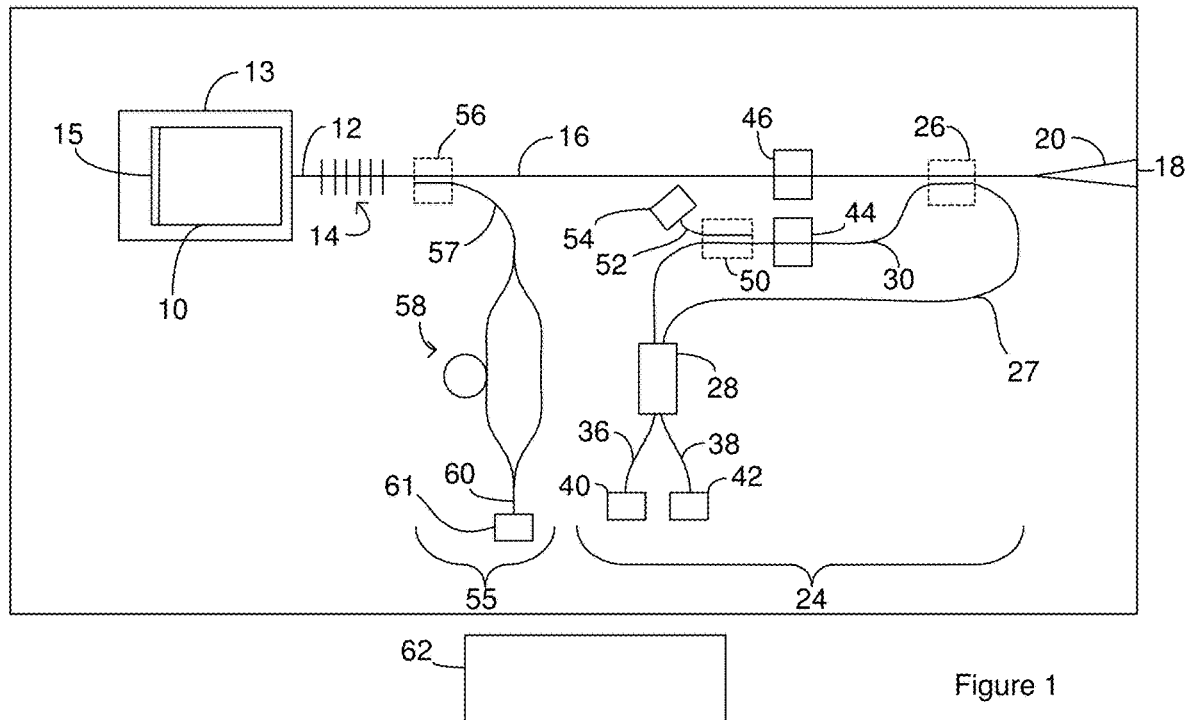
FIG. 1 is a top view of a LIDAR chip.

The LIDAR system includes electronics associated with a LIDAR chip. The electronics are configured to operate the LIDAR chip such that the LIDAR chip generates an outgoing LIDAR signal that is output from the LIDAR chip as a LIDAR output signal. During operation of the LIDAR system, the LIDAR output signal is reflected by an object located off the LIDAR chip. The reflected light signal returns to the LIDAR chip as a LIDAR input signal. The LIDAR chip combines the LIDAR input signal with a reference signal that includes light from the outgoing LIDAR signal so as to form at last one composite signal that is beating as a result of a frequency difference between the LIDAR input signal and the reference signal.

The composite signals are converted to electrical data signals that are also beating as a result of the frequency difference between the LIDAR input signal and the reference signal. The electronics process the electrical data signals so as to generate LIDAR data (the distance between the LIDAR chip and the reflecting object and/or the radial velocity between the LIDAR chip and the reflecting object). The processing of the electrical data signals can be digital processing while the electrical data signals are analog signals. Accordingly, the LIDAR system includes one or more Analog-to-Digital Converters (ADCs) to convert analog electrical signals that include or indicate the LIDAR data to digital signals.

The one or more Analog-to-Digital Converters (ADCs) sample the composite signals at a sample rate. The sample rate needed to provide useful results increases as the beat frequency of a composite signal increases. Since the beat frequency increases with increases in the maximum radial velocity between the LIDAR chip and the reflecting object (i.e. the maximum Doppler shift) and as the separation between the LIDAR chip and the reflecting object increases, the required sampling frequency also increases. As a result, the required sampling rate increases as the maximum radial velocity increases and/or the maximum separation increases.

In many LIDAR applications, the increase in the maximum radial velocity and/or the separation are such that the required sampling rate increases to a point where sampling is impractical to implement and/or impractically expensive. The required sampling rate can be reduced by dividing the generation of LIDAR data into a series of cycles where LIDAR data is generated for each cycle. In some instances, each of the cycles corresponds to a different region in a field of view. Accordingly, different cycles can generate LIDAR data for different regions in a field of view.

The cycles can be performed such that the time for each cycle can be divided into different time periods that include at least a distance time period and a velocity time period. The distance between the reflecting object and the LIDAR chip can be determined in the distance period and the radial velocity between the reflecting object and the LIDAR chip can be determined in the velocity period.

During the distance period, the LIDAR system reduces or essentially removes the effects of the radial velocity from the beating of the electrical data signals. For instance, the frequency shift of the LIDAR output signal relative to the LIDAR input signal ("frequency shift," $\Delta f$) has a contribution from the Doppler shift and from the distance between the reflecting object and the LIDAR chip. The LIDAR output signal can be configured such that the change in frequency due to the Doppler shift ($\Delta f_d$) is less than 10%, 1%%, 0.1%, or 0.01% of the Doppler shift between two objects moving relative to one another with a non-zero radial velocity and one of the objects transmitting a continuous wave signal at the frequency of the LIDAR output signal. This reduction and/or removal of the change in frequency due to the Doppler shift ($\Delta f_d$) from the frequency shift lowers the beat frequency and accordingly reduces the required sampling rate During the velocity period, the LIDAR system reduces or essentially removes the effects of distance between the reflecting object and the LIDAR chip from the beating of the electrical data signals. As a result, the relative distance does not substantially contribute to the required sampling rate during the velocity period. Accordingly, the required sampling rate is reduced during the velocity period.

Since the required sampling rate is reduced during the both velocity period and the distance period, the sampling rate used by the LIDAR system is substantially reduced to levels where the ADC sampling in the LIDAR system is both practical and affordable.

FIG. 1 is a topview of a LIDAR chip that includes a laser cavity. The laser cavity includes a light source 10 that can include or consist of a gain medium (not shown) for a laser. The LIDAR chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the LIDAR chip is located further away from the LIDAR chip.

The partial return device 14 passes a portion of the light signal received from the cavity waveguide 12 to a utility waveguide 16 included on the LIDAR chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the LIDAR chip and serves as a LIDAR output signal. For instance, the facet 18 can be positioned at an edge of the LIDAR chip so the outgoing LIDAR signal traveling through the facet 18 exits the LIDAR chip and serves as a LIDAR output signal.

The LIDAR output signal travels away from the LIDAR chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the LIDAR chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The LIDAR chip includes a data branch 24 where the optical signals that are processed for LIDAR data are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30 as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off the LIDAR chip while the LIDAR output signal has not been reflected. When the LIDAR chip and the reflecting object are moving relative to one another, the comparative signal and the reference signal have different frequencies due to the Doppler effect and/or the delay between transmission of the LIDAR output signal and receipt of the LIDAR input signal. As a result, beating occurs between the comparative signal and the reference signal.

The light-combining component 28 also splits the resulting composite signal onto a first detector waveguide 36 and a second detector waveguide 38. The first detector waveguide 36 carries a first portion of the composite signal to a first light sensor 40 that converts the first portion of the composite signal to a first electrical signal. The second detector waveguide 38 carries a second portion of the composite signal to a second light sensor 42 that converts the second portion of the composite signal to a second electrical signal. In some instances, the light-combining component 28 splits the composite signal such that the portion of the comparative signal in the first portion of the composite signal is phase shifted by 180□ relative to the portion of the comparative signal in the second portion of the composite signal but the portion of the reference signal in the first portion of the composite signal is not phase shifted relative to the portion of the reference signal in the second portion of the composite signal. Alternately, the light-combining component 28 splits the composite signal such that the portion of the reference signal in the first portion of the composite signal is phase shifted by 180□ relative to the portion of the reference signal in the second portion of the composite signal but the portion of the comparative signal in the first portion of the composite signal is not phase shifted relative to the portion of the comparative signal in the second portion of the composite signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal that is beating as a result of the beating between the comparative signal and the reference signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the LIDAR chip includes a single detector waveguide that carries the composite signal to the light sensor.

The data branch includes a data optical attenuator 44 positioned along the comparative waveguide 30 such that the data optical attenuator 44 can be operated so as to attenuate the comparative signal on the comparative waveguide 30. The LIDAR chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier injection based PIN diodes, electro-absorption modulators, and Mach-Zehnder (MZ) modulators.

The LIDAR chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The LIDAR chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the LIDAR chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the LIDAR chip, all or a portion of the electronics can be included on the LIDAR chip. For instance, the LIDAR chip can include electrical conductors that connect the first light sensor 40 in series with the second light sensor 42.

During operation of the LIDAR chip, the electronics 62 operate the light source 10 such that the laser cavity outputs the outgoing LIDAR signal. The electronics 62 operate the LIDAR chip through a series of cycles where each cycle generates LIDAR data for a region in a field of view. During each cycle, the data signal is sampled multiple times. During each of the samples, the electronics tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instance, a cycle includes at least a first period and a second period such as a distance period and a velocity period. In some instances, the first period and the second period add up to the total time of a cycle. However, in some instances, the first period and the second period do not add up to the time of a cycle. For instance, the total time of a cycle can include the time needed to move a LIDAR output signal from one region in a field of view to another region in the field of view.

During the first period, the electronics 62 can increase the frequency of the outgoing LIDAR signal and during a second period the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first period, the electronics 62 can increase the frequency of the outgoing LIDAR signal (and accordingly a LIDAR output signal) such that the wavelength decreases from 1550 nm to 1459.98 nm followed by a second period where the frequency of the outgoing LIDAR signal is decreased such that the wavelength increases from 1459.98 nm to 1550 nm.

When the outgoing LIDAR signal frequency is increased during the first period, the LIDAR output signal travels away from the LIDAR chip and then returns to the LIDAR chip as a LIDAR input signal. A portion of the LIDAR input signal becomes the comparative signal. During the time that the LIDAR output signal and the LIDAR input signal are traveling between the LIDAR chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the LIDAR chip, the more the frequency of the reference signal increases before the LIDAR input signal returns to the LIDAR chip. Accordingly, the larger the difference between the frequency of the comparative signal and the frequency of the reference signal, the further the reflecting object is from the LIDAR chip. As a result, the difference between the frequency of the comparative signal and the frequency of the reference signal is a function of the distance between the LIDAR chip and the reflecting object.

For the same reasons, when the outgoing LIDAR signal frequency is decreased during the second period, the comparative signal enters the light-combining component with a higher frequency than the reference signal concurrently entering the light-combining component and the difference between the frequency of the comparative signal and the frequency of the reference signal during the second period is also function of the distance between the LIDAR chip and the reflecting object.

In some instances, the difference between the frequency of the comparative signal and the frequency of the reference signal can also be a function of the Doppler effect because relative movement of the LIDAR chip and reflecting object can also affect the frequency of the comparative signal. For instance, when the LIDAR chip is moving toward or away from the reflecting object and/or the reflecting object is moving toward or away from the LIDAR chip, the Doppler effect can affect the frequency of the comparative signal. Since the frequency of the comparative signal is a function of the speed the reflecting object is moving toward or away from the LIDAR chip and/or the speed the LIDAR chip is moving toward or away from the reflecting object, the difference between the frequency of the comparative signal and the frequency of the reference signal is also a function of the speed the reflecting object is moving toward or away from the LIDAR chip and/or the speed the LIDAR chip is moving toward or away from the reflecting object. Accordingly, the difference between the frequency of the comparative signal and the frequency of the reference signal is a function of the distance between the LIDAR chip and the reflecting object and is also a function of the Doppler effect.

The composite signal and the data signal each effectively compares the comparative signal and the reference signal. For instance, since the light-combining component combines the comparative signal and the reference signal and these signals have different frequencies, there is beating between the comparative signal and reference signal. Accordingly, the composite signal and the data signal have a beat frequency related to the frequency difference between the comparative signal and the reference signal and the beat frequency can be used to determine the difference in the frequency of the comparative signal and the reference signal. A higher beat frequency for the composite signal and/or the data signal indicates a higher differential between the frequencies of the comparative signal and the reference signal. As a result, the beat frequency of the data signal is a function of the distance between the LIDAR chip and the reflecting object and is also a function of the Doppler effect.

As noted above, the beat frequency is a function of two unknowns; the distance between the LIDAR chip and the reflecting object and the radial velocity of the LIDAR chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the radial velocity of the LIDAR chip and the reflecting object and c is the speed of light in air. The use of multiple different samples permits the electronics 62 to resolve the two unknowns. For instance, the beat frequency determined for the first period is related to the unknown distance and Doppler contribution and the beat frequency determined for the second period is also related to the unknown distance and Doppler contribution. The availability of the two relationships allows the electronics 62 to resolve the two unknowns. Accordingly, the distance between the LIDAR chip and the reflecting object can be determined without influence from the Doppler effect. Further, in some instances, the electronics 62 use this distance in combination with the Doppler effect to determine the velocity of the reflecting object toward or away from the LIDAR chip.

In instances where the radial velocity of target and source is zero or very small, the contribution of the Doppler effect to the beat frequency is essentially zero. In these instances, the Doppler effect does not make a substantial contribution to the beat frequency and the electronics 62 can take only the first period to determine the distance between the LIDAR chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the sample, the electronics 62 can have a range of suitable values for the electrical control signal magnitude as a function of time. At multiple different times during a sample, the electronics 62 can compare the electrical control signal magnitude to the range of values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instance, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated LIDAR chip, the minimum power drop threshold can be around 35 dB (0.03%). Accordingly, the returned LIDAR signal can affect the performance of the laser cavity when the power of the returned LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the LIDAR input signal, the magnitude of the sampling signal is related to the power of the LIDAR input signal. This result means the magnitude of the sampling signal is also related to the power of the returned LIDAR signal because the returned LIDAR signal is a portion of the lidar input signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the LIDAR chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal.

Figure 2:
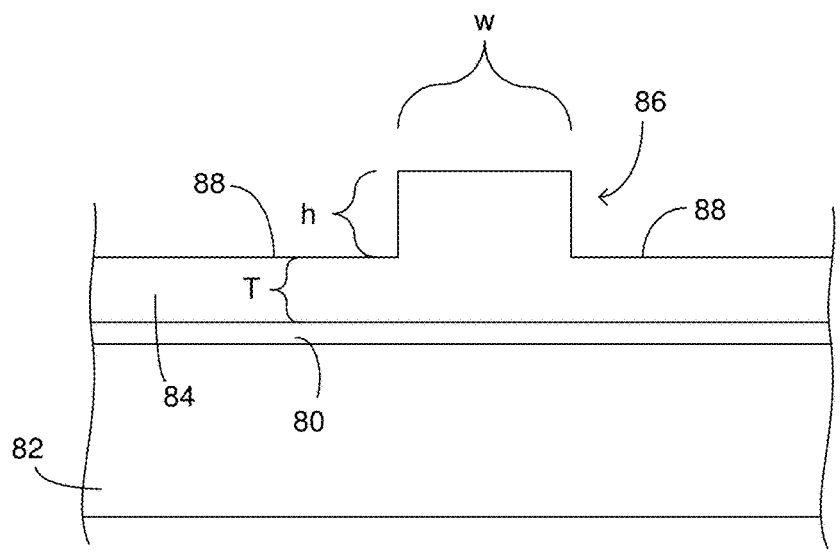
FIG. 2 is a cross-section of a LIDAR chip according to FIG. 1 constructed from a silicon-on-insulator wafer.

Suitable platforms for the LIDAR chip include, but are not limited to, silica, indium phosphide, and silicon-on-insulator wafers. FIG. 2 is a cross-section of portion of a LIDAR chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire LIDAR chip. For instance, the optical components shown in FIG. 1 can be positioned on or over the top and/or lateral sides of the substrate.

The portion of the LIDAR chip illustrated in FIG. 2 includes a waveguide construction that is suitable for use with LIDAR chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 μm and can be in a range of 4 μm to 12 μm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the LIDAR chip and then attached to the LIDAR chip. For instance, the light source 10 can be a gain element that is attached to the LIDAR chip using a flip-LIDAR chip arrangement.

Use of flip-LIDAR chip arrangements is suitable when the light source 10 is to be interfaced with a ridge waveguide on a LIDAR chip constructed from silicon-on-insulator wafer. Examples of suitable interfaces between flip-LIDAR chip gain elements and ridge waveguides on LIDAR chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the LIDAR chip and then attached to the LIDAR chip. For instance, the attenuator can be included on an attenuator LIDAR chip that is attached to the LIDAR chip in a flip-LIDAR chip arrangement. The use of attenuator LIDAR chips is suitable for all or a portion of the attenuators selected from the group consisting of the data attenuator and the control attenuator.

As an alternative to including an attenuator on a separate component, all or a portion of the attenuators can be integrated with the LIDAR chip. For instance, examples of attenuators that are interfaced with ridge waveguides on a LIDAR chip constructed from a silicon-on-insulator wafer can be found in U.S. Pat. No. 5,908,305, issued on Jun. 1, 1999; each of which is incorporated herein in its entirety. The use of attenuators that are integrated with the LIDAR chip are suitable for all or a portion of the light sensors selected from the group consisting of the data attenuator and the control attenuator.

Light sensors that are interfaced with waveguides on a LIDAR chip can be a component that is separate from the LIDAR chip and then attached to the LIDAR chip. For instance, the light sensor can be a photodiode, or an avalanche photodiode. Examples of suitable light sensor components include, but are not limited to, InGaAs PIN photodiodes manufactured by Hamamatsu located in Hamamatsu Ciy, Japan, or an InGaAs APD (Avalanche Photo Diode) manufactured by Hamamatsu located in Hamamatsu City, Japan. These light sensors can be centrally located on the LIDAR chip as illustrated in FIG. 1. Alternately, all or a portion the waveguides that terminate at a light sensor can terminate at a facet 18 located at an edge of the LIDAR chip and the light sensor can be attached to the edge of the LIDAR chip over the facet 18 such that the light sensor receives light that passes through the facet 18. The use of light sensors that are a separate component from the LIDAR chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the LIDAR chip. For instance, examples of light sensors that are interfaced with ridge waveguides on a LIDAR chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,8472, issued on Aug. 22, 2000 each of which is incorporated herein in its entirety. The use of light sensors that are integrated with the LIDAR chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal from one region in a field of view to another region. Different cycles can correspond to different regions in the field of view. Accordingly, each cycle can provide LIDAR data for a region in the field of view. The above LIDAR chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
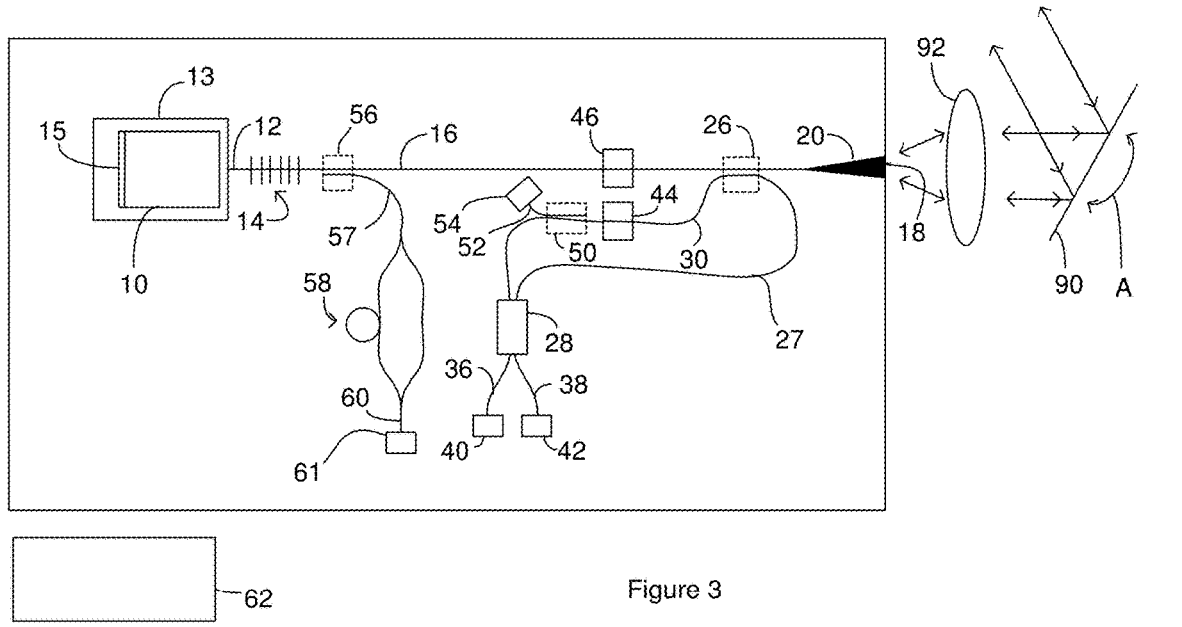
FIG. 3 illustrates the LIDAR chip of FIG. 1 used with an off-LIDAR chip scanning mechanism.

FIG. 3 illustrates the above LIDAR chip used with a reflecting device 90 and a collimating device 92. For instance, a lens serves as a collimating device that receives the LIDAR output signal and provides collimation of the LIDAR output signal. A mirror serves as a reflecting device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in two dimensions or three dimensions. Suitable mirrors include, but are not limited to, mechanically driven mirrors and Micro Electro Mechanical System (MEMS) mirrors.

Figure 4:
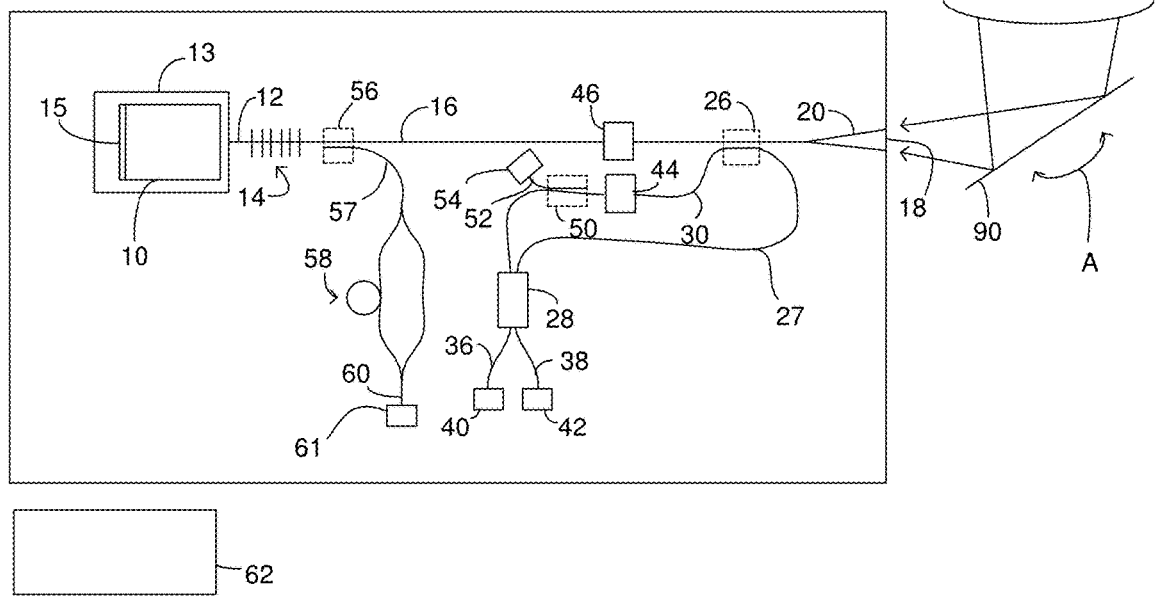
FIG. 4 illustrates the LIDAR chip of FIG. 1 used with another embodiment of an off-LIDAR chip scanning mechanism.

FIG. 4 illustrates the above LIDAR chip used with a reflecting device 90 and a collimating device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
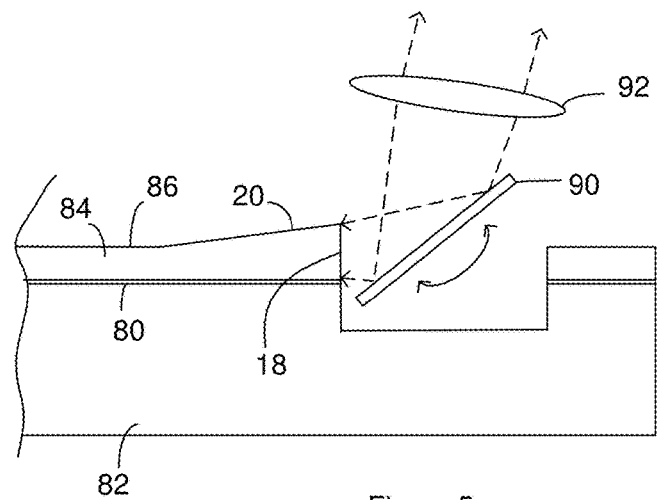
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the LIDAR chip. For instance, FIG. 5 is a cross section of a portion of the LIDAR chip taken through the longitudinal axis of the utility waveguide 16. The illustrated LIDAR chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

The above LIDAR chips can be modified to include components in addition to the components illustrated above. For instance, FIG. 6A the above LIDAR chip modified to include a modulator 98 along the utility waveguide 16. The modulator 98 is configured to modulate the power of the outgoing LIDAR signal and accordingly the LIDAR output signal. The electronics can operate the modulator. Accordingly, the electronics can modulate the power of the outgoing LIDAR signal and accordingly the LIDAR output signal.

Figure 6A:
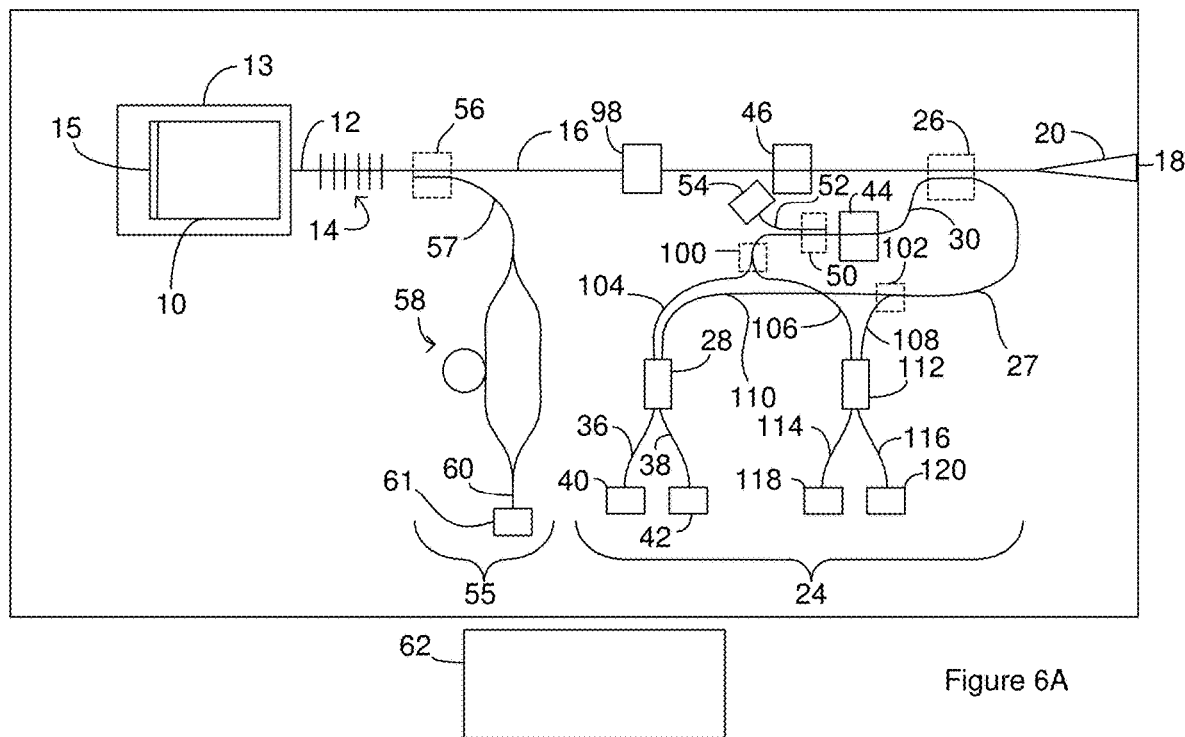
FIG. 6A illustrates the LIDAR chip of FIG. 1 modified to include multiple different balanced detectors for further refining data generated by the LIDAR chip.

The modulator 98 can be positioned along the utility waveguide 16 before the optical coupler 26. For instance, FIG. 6A shows the modulator positioned along the utility waveguide 16 between the directional coupler 56 and the output optical attenuator 46. Suitable modulators include, but are not limited to, PIN diode carrier injection devices, Mach-Zehnder modulator devices, and electro-absorption modulator devices. When the LIDAR chip is constructed on a silicon-on-insulator platform, a suitable modulator is disclosed in U.S. Patent application serial number 617,810, filed on Sep. 21, 1993, entitled Integrated Silicon PIN Diode Electro-Optic Waveguide, and incorporated herein in its entirety.

FIG. 6A also illustrates the above LIDAR chips modified so that data branch includes multiple secondary branches that each includes a balanced detector and are employed to refine the optical data provided to the electronics. The reference signal and the comparative signal are divided among the different secondary branches and accordingly among the balanced detectors. For instance, the LIDAR chip shown in FIG. 6A includes two different balanced detectors.

A first splitter 102 divides the reference signal carried on the reference waveguide 27 onto a first reference waveguide 110 and a second reference waveguide 108. The first reference waveguide 110 carries a first portion of the reference signal to the light-combining component 28. The second reference waveguide 108 carries a second portion of the reference signal to a second light-combining component 112.

A second splitter 100 divides the comparative signal carried on the comparative waveguide 30 onto a first comparative waveguide 104 and a second comparative waveguide 106. The first comparative waveguide 104 carries a first portion of the comparative signal to the light-combining component 28. The second comparative waveguide 108 carries a second portion of the comparative signal to the second light-combining component 112.

The first light-combining component 28 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 112 also splits the resulting composite signal onto a first auxiliary detector waveguide 114 and a second auxiliary detector waveguide 116.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

Figure 6B:
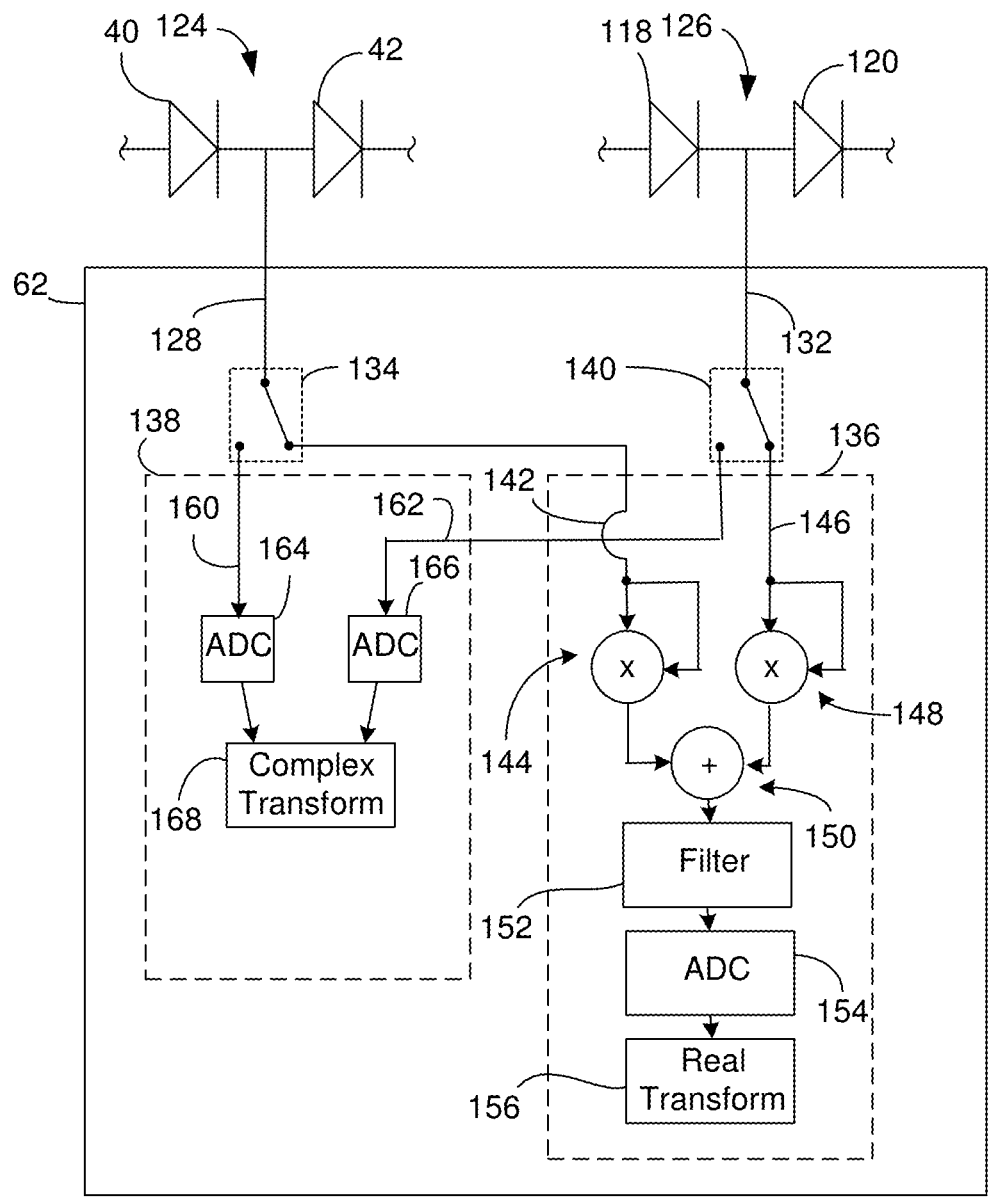
FIG. 6B provides a schematic of electronics that are suitable for use with the LIDAR chip of FIG. 6A.

The first light sensor 40 and the second light sensor 42 can be connected as a balanced detector and the first auxiliary light sensor 118 and the second auxiliary light sensor 120 can also be connected as a balanced detector. For instance, FIG. 6B provides a schematic of the relationship between the electronics, the first light sensor 40, the second light sensor 42, the first auxiliary light sensor 118, and the second auxiliary light sensor 120. The symbol for a photodiode is used to represent the first light sensor 40, the second light sensor 42, the first auxiliary light sensor 118, and the second auxiliary light sensor 120 but one or more of these sensors can have other constructions. In some instances, all of the components illustrated in the schematic of FIG. 6B are included on the LIDAR chip. In some instances, the components illustrated in the schematic of FIG. 6B are distributed between the LIDAR chip and electronics located off of the LIDAR chip.

The electronics connect the first light sensor 40 and the second light sensor 42 as a first balanced detector 124 and the first auxiliary light sensor 118 and the second auxiliary light sensor 120 as a second balanced detector 126. In particular, the first light sensor 40 and the second light sensor 42 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal, i.e. the beating in the first composite signal and in the second composite signal.

The first data line 128 carries the first data signal to a first switch 134. The first switch can be in a first configuration where the first data signal is carried to a distance branch 136 or in a second configuration where the first data signal is carried to a velocity branch 138. In FIG. 6B, the first switch 134 is shown in the first configuration. The second data line 132 carries the second data signal to a second switch 140. The second switch can be in a first configuration where the second data signal is carried to the distance branch 136 or in a second configuration where the second data signal is carried to a velocity branch 138. In FIG. 6B, the second switch 140 is shown in the first configuration. A suitable switch for use as the first switch and/or second switch includes, but is not limited to, an electromechanical switch, and a solid state MOSFET or PIN diode switch.

The electronics operate the first switch and the second switch such that they are in the same configuration during the first period and during the second period. For instance, the electronics can operate the first switch and the second switch such that the first switch and the second switch are both in the first configuration during the first period and both in the second configuration during the second period. In this example, the first data signal and the second data signal are carried to the distance branch 136 during the first period and to the velocity branch 138 during the second period.

The distance branch can be configured to use the first data signal and the second data signal to determine or approximate at least the distance between the LIDAR chip and the reflecting object. For instance, during the first period, the electronics can operate the modulator 98 so as to modulate the amplitude of the outgoing LIDAR signal and accordingly the LIDAR output signal. The amplitude of the outgoing LIDAR signal can be modified such that the amplitude of the outgoing LIDAR signal is a function of a sinusoid. In one example, the amplitude of the outgoing LIDAR signal is modulated such that the amplitude of the electrical field of the outgoing LIDAR signal is a square root of a function that includes a sinusoid and/or is a square root of a sinusoid. For instance, the outgoing LIDAR signal can be modulated so as to produce a modulated outgoing LIDAR signal and accordingly, a LIDAR output signal, with an electrical field magnitude represented by Equation 1: $(M+N*\cos(E+C*t+D*t^2))^{1/2} \cos(F*t)$ E, M, N, C, D and F are constants, t represents time where t=0 at the start of the period, M>0, N>0, M≥N in order to prevent the radicand from becoming negative, C>0, D≠0, E can be zero or non-zero, and F≠0. As will become evident below, F can be a function of $f_c$, where $f_c$ represents the frequency of the carrier signal and can accordingly represent the frequency of the LIDAR output signal. In Equation 1, F and C can be selected such that F>>C. In Equation 1, the term cos(F*t) can represent the outgoing LIDAR signal output from the partial return device 14 and can serve as a carrier signal. The $(M+N*\cos(E+C*t+D*t^2))^{1/2}$ term can represent the amplitude modulation signal of the outgoing LIDAR signal provided by the modulator 98. The amplitude modulation signal is a function of a sinusoid with a frequency (an envelope frequency) that may or may not vary with time. Accordingly, the amplitude modulation signal can be a function of a sinusoid with a chirped or unchirped frequency.

The distance branch includes a first distance branch line 142. During the first period, the first distance branch line 142 carries the first data signal to a first multiplier 144. In FIG. 6B, the first multiplier 144 is configured to square the amplitude of the first data signal and to output a first multiplied data signal. The distance branch includes a second distance branch line 146. During the first period, the second distance branch line 146 carries the second data signal to a second multiplier 148. In FIG. 6B, the second multiplier 148 is configured to square the amplitude of the second data signal and to output a second multiplied data signal. Suitable first multipliers and/or second multipliers include, but are not limited to, RF mixers such as a Gilbert cell mixer.

The distance branch includes an adder 150 that sums the first multiplied data signal and the second multiplied data signal. The adder outputs a summed data signal. Suitable adders include, but are not limited to, RF combiners including resistive or hybrid combiners. The distance branch includes a low-pass filter 152 that receives the summed data signal and outputs a beating data signal. The low-pass filter is selected to remove higher frequency contributions to the summed data signal that are artifacts of the mixing of the reference and return signals. The low-pass filter can be selected to have a bandwidth greater than or equal to: $f_{dmax}/2+\alpha\tau_{0max}$ where $f_{dmax}$ represents the maximum level of the Doppler shift of the LIDAR input signal relative to the LIDAR input signal for which the LIDAR system is to provide reliable results, $\tau_{0max}$ represents maximum delay between transmission of the LIDAR output signal and the receipt of the LIDAR input signal, and α represents the rate of change in the frequency of the chirp added to the envelope frequency of the modulated outgoing LIDAR signal during the duration of the sample period (i.e. the first period). In some instances, c is determined from B/T where B represents the change in the frequency of the chirp added to the envelope frequency during the duration of the sample period and T is the duration of the sample period. In some instances, T is determined from:

$$T = \frac{\lambda_c}{2\Delta v_{min}} + \tau_{0max}$$

where $\lambda_c$ represents the wavelength of the outgoing LIDAR signal, $\Delta v_{min}$ represents velocity resolution and B can be determined from $$B = \frac{cT}{2(T - \tau_{0max})\Delta R_{min}}$$

where c represents the speed of light and $\Delta R_{min}$ represents distance resolution. In some instances, the filter has a bandwidth greater than 0.1 GHz, 0.2 GHz, or 0.3 GHz and/or less than 0.4 GHz, 0.5 GHz, or 1 GHz. Corresponding values for the sweep period (T) can be 10 μs, 8 μs, 4 μs, 3 μs, 2 μs, and 1 μs.

The distance branch includes an Analog-to-Digital Converter (ADC) 154 that receives the beating data signal from the filter. The Analog-to-Digital Converter (ADC) 154 converts the beating data signal from an analog form to digital form and outputs the result as a digital LIDAR data signal. As discussed above, the conversion of the beating data signal includes sampling the beating data signal at a sampling rate. The modulation of the amplitude of the outgoing LIDAR output signal substantially reduces or removes the effects of radial velocity from the beating of the composite signal and the resulting electrical signals. For instance, the frequency shift of the LIDAR output signal relative to the LIDAR input signal ("frequency shift," Δf) can be written as $\Delta f=\Delta f_d+\Delta f_s$ where $\Delta f_d$ represents the change in frequency due to the Doppler shift and $\Delta f_s$ is the change in frequency due to the separation between the reflecting object and the LIDAR chip. The outgoing LIDAR signal can be modulated so as to produce a modulated outgoing LIDAR signal and accordingly, a LIDAR output signal that is also modulated, where the change in frequency due to the Doppler shift ($\Delta f_d$) is less than 10%, 5%, 1%, or even 0.1% of the Doppler shift that would occur from a sinusoidal LIDAR output signal serving as the LIDAR and having a constant amplitude and the same frequency as the modulated outgoing LIDAR signal and/or the LIDAR output signal. For instance, the outgoing LIDAR signal and/or the LIDAR output signal can be modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from a continuous wave serving as the LIDAR output signal and having the same frequency as the modulated outgoing LIDAR signal and/or the LIDAR output signal. In another example, the outgoing LIDAR signal and/or the LIDAR output signal are modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from the outgoing LIDAR signal before modulation (the unmodulated outgoing LIDAR signal) serving as the LIDAR output signal. These results can be achieved by increasing the value of the Equation 1 variable F relative to C. For instance, F can represent $2\pi f_c$ and C can represent $2\pi f_1$ where $f_1$ denotes the base frequency of the frequency-chirp in the amplitude of the modulated outgoing LIDAR signal. Accordingly, F can be increased relative to C by increasing the value of the frequency of the LIDAR output signal ($f_c$) relative to the chirp base frequency ($f_1$). As an example, $f_c$ and $f_1$ can be selected such that $f_c>>f_1$. In some instances, $f_c$ and $f_1$ are selected such that a ratio of $f_c$:$f_1$ is greater than 2:1, 10:1, $1\times10^4$:1, $5\times10^4$, or $1\times10^5$:1 and/or less than $5\times10^5$, $1\times10^6$, $5\times10^6$ or $5\times10^8$. Accordingly, the variables F and C can also have these same values for a ratio of F:C. The reduction and/or removal of the change in frequency due to the Doppler shift ($\Delta f_d$) from the frequency shift lowers the beat frequency and accordingly reduces the required sampling rate.

The distance branch includes a transform module 156 that receives the digital LIDAR data signal from the Analog-to-Digital Converter (ADC) 154. The transform module 156 is configured to perform a real transform on the digital LIDAR data signal so as to convert from the time domain to the frequency domain. This conversion provides an unambiguous solution for the shift in frequency of the shift of the LIDAR input signal relative to the LIDAR input signal that is caused by the distance between the reflecting object and the LIDAR chip. A suitable real transform is a Fourier transform such as a Fast Fourier Transform (FFT). The classification of the transform as a real transform distinguishes the transform from complex transforms such as complex Fourier transforms. The transform module can execute the attributed functions using firmware, hardware or software or a combination thereof.

Since the frequency provided by the transform module does not have input from, or does not have substantial input from, a frequency shift due to relative movement, the determined frequency shift can be used to approximate the distance between the reflecting object and the LIDAR chip. For instance, the electronics can approximate the distance between the reflecting object and the LIDAR chip ($R_O$) using Equation 3: $R_O = c^* \Delta f/(2\alpha)$ where $\Delta f$ can be approximated as the peak frequency output from the transform module, and c is the speed of light.

The velocity branch can be configured to use the first data signal and the second data signal to determine or approximate at least the radial velocity of the LIDAR chip and the reflecting object. The LIDAR output signal with a frequency that is a function of time disclosed in the context of FIG. 1 can be replaced by a LIDAR output signal where the frequency of the LIDAR output signal is not a function of time. For instance, the LIDAR output signal can be a continuous wave (CW). For instance, during the second period, the modulated outgoing LIDAR signal, and accordingly the LIDAR output signal, can be an unchirped continuous wave (CW). As an example the modulated outgoing LIDAR signal, and accordingly the LIDAR output signal, can be represented by Equation 2: $G^*\cos(H^*t)$ where G and H are constants and t represents time. In some instances, G represents the square root of the power of the outgoing LIDAR signal and/or H represents the constant F from Equation 1. In instances where the output of the laser cavity has the waveform that is desired for the modulated outgoing LIDAR signal, the electronics need not operate the modulator 98 so as to modify the outgoing LIDAR signal. In these instances, the output of the laser cavity can serve as the modulated outgoing LIDAR signal and accordingly the LIDAR output signal. In some instances, the electronics operate the modulator 98 so as to generate a modulated outgoing LIDAR signal with the desired form.

Since the frequency of the LIDAR output signal is constant in the second period, changing the distance between reflecting object and LIDAR chip does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the LIDAR output signal.

The velocity branch includes a first velocity branch line 160 and a second velocity branch line 160. During the second period, the first velocity branch line 160 carries the first data signal to an Analog-to-Digital Converter (ADC) 164 which converts the first data signal from an analog form to a digital form and outputs a first digital data signal. As discussed above, the conversion of the first data signal is done by sampling the first data signal at a sampling rate. The use of a continuous wave as the LIDAR output signal substantially removes the effects of distance between the reflecting object and LIDAR chip from the beating of the composite signal and the resulting electrical signals. Accordingly, the beating frequency is reduced and the required sampling rate is reduced.

The second velocity branch line 162 carries the second data signal to an Analog-to-Digital Converter (ADC) 166 which converts the second data signal from an analog form to a digital form and outputs a second digital data signal. As discussed above, the conversion of the second data signal includes sampling the second data signal at a sampling rate. The use of a continuous wave as the LIDAR output signal substantially reduces or removes the effects of distance between the reflecting object and LIDAR chip from the beating of the second composite signal and the resulting electrical signals. Accordingly, the beating frequency is reduced and the required sampling rate is reduced.

The sampling rate for the Analog-to-Digital Converter (ADC) 164 can be the same or different from the sampling rate for the Analog-to-Digital Converter (ADC) 166.

The velocity branch includes a transform module 168 that receives the first digital data signal from the Analog-to-Digital Converters (ADC) 164 and the second digital data signal from the Analog-to-Digital Converters (ADC) 166. Since the first data signal is an in-phase component and the second data signal its quadrature component, the first data signal and the second data signal together act as a complex velocity data signal where the first data signal is the real component and the second data signal is the imaginary component. As a result, the first digital data signal can be the real component of a digital velocity data signal and the second data signal can be the imaginary component of the digital velocity data signal. The transform module 168 can be configured to perform a complex transform on the digital velocity data signal so as to convert from the time domain to the frequency domain. This conversion provides an unambiguous solution for the shift in frequency of LIDAR input signal relative to the LIDAR input signal that is caused by the radial velocity between the reflecting object and the LIDAR chip. A suitable complex transform is a Fourier transform such as a complex Fast Fourier Transform (FFT). The transform module can execute the attributed functions using firmware, hardware or software or a combination thereof.

Since the frequency shift provided by the transform module 168 does not have input from a frequency shift due to the separation distance between the reflecting object and the LIDAR chip, and because of the complex nature of the velocity data signal, the output of the transform module 168 can be used to approximate the radial velocity between the reflecting object and the LIDAR chip. For instance, the electronics can approximate the radial velocity between the reflecting object and the LIDAR chip (v) using Equation 4: $v = c^* f_d/(2^* f_c)$ where $f_d$ is approximated as the peak frequency output from the transform module 168, c is the speed of light, and $f_c$ represents the frequency of the LIDAR output signal.

Additional components can be added to the schematic of FIG. 6B. For instance, when the LIDAR system generates multiple LIDAR output signals or is used with other LIDAR systems that generate LIDAR output signals (i.e., by means of frequency or wavelength division multiplexing, FDM/WMD), the LIDAR system can include one or more filters to remove interfering signals from the real and/or imaginary components of the beating data signal and/or of the velocity data signal. Accordingly, the LIDAR system can include one or more filters in addition to the illustrated components. Suitable filters include, but are not limited to, lowpass filters. In the case of the optical design, if the frequency of the interfering components fall outside the bandwidth of the balance detector(s), additional filtering may not be necessary as it may be effectively provided by the balance detector(s).

The sampling rate that is used during the first period and the second period can be selected to have a value that is greater than or equal to the larger of two values selected from the group consisting of the minimum sampling rate for the first period and the minimum sampling rate for the second period. For instance, during the first period the range of rates for the first period sampling rate ($f_{s1}$) can be determined by $f_{s1} \geq 2 \times \alpha \tau_{0max}$ where $\tau_{0max}$ represents the maximum amount of time between the transmission of the LIDAR output signal and the receipt of the LIDAR input signal. During the second period the range of rates for the second period sampling rate ($f_{s2}$) can be determined by $f_{s2} \geq 2 \times f_{dmax}$ where $f_{dmax}$ represents the maximum level of the Doppler shift of the LIDAR input signal relative to the LIDAR input signal for which the LIDAR system is to provide reliable results. The maximum is determined by the largest level for which the LIDAR system is to provide reliable results. Accordingly, the maximum distance generally corresponds to the distance for the field of view set in the LIDAR specifications and the maximum Doppler shift generally corresponds to the Doppler shift that would occur at the maximum radial velocity values set in the specifications. These two equations show that the minimum sampling rate for the first period is $2\alpha\tau_{0max}$ and the minimum sampling rate for the second period is $2f_{dmax}$. As a result, the sampling rate is selected to have a value that is greater than or equal to the larger of $2\alpha\tau_{0max}$ and $2f_{dmax}$. In other words, the sample rate used during the first period and the second period ($f_s$) is $f_s \geq \max(2\alpha\tau_{0max}, 2f_{dmax})$. In some instances, the sample rate used during the first period and the second period ($f_s$) is greater than or equal to 0.1 GHz, 0.2 GHz, or 0.5 GHz and/or less than 1 GHz, 2 GHz, or 4 GHZ Example 1

During an example of a first period that serves as a distance period, the amplitude of the outgoing LIDAR signal is modulated so the modulated outgoing LIDAR signal can be represented by Equation 5: $s_{tx} = \sqrt{M + N\cos(2\pi f_1 t + \pi \alpha t^2)} \cos(2\pi f_c t)$ where M and N are constants that are each greater than 0 and M≥N and $f_1$ denotes the base frequency of the frequency chirping of the amplitude, t represents time after transmission of the LIDAR output signal, 0<t<τ where τ represents the amount of time between the transmission of the LIDAR output signal and the receipt of the LIDAR input signal, $f_c$ can represents the frequency of the carrier signal and can accordingly be the frequency of the LIDAR output signal and α represents B/T where B represents the modulation linear frequency sweep in Hertz and T is the sweep period in seconds.

A LIDAR input signal that results from a LIDAR output signal according to Equation 5 can be expressed by the following Equation 6: $s_{rx} = \sqrt{M + N\cos(2\pi f_1(t-\tau) + \pi\alpha(t-\tau)^2)} \cos(2\pi f_c(t-\tau))$ where power losses due to propagation and other effects are ignored for simplicity.

As discussed above, the LIDAR input signal is combined with the in-phase component of the reference signal and the quadrature component of the reference signal as described above. The first reference signal portion and the second reference signal portion can be represented as shown in Equation 7: $S_{ref}(t) = \sqrt{(M + N\cos(2\pi f_1 t + \pi\alpha t^2))} \cos(2\pi f_c t), \sqrt{M + N\cos(2\pi f_1 t + \pi\alpha t^2)} \sin(2\pi f_c t))$ where power scaling is not shown for simplicity. The LIDAR input signal is also split into a first portion of the comparative signal and a second portion of the comparative signal as described above. The first portion of the comparative signal is mixed with the first reference signal portion to provide the first composite signal and the second portion of the comparative signal is mixed with the second reference signal portion to provide the second composite signal. This mixing process results in a complex beat signal where the real component of the complex beat signal is provided by the first composite signal and the imaginary component of the complex beat signal is provided by the second composite signal.

The first composite signal contains the cosine (sine) of the difference of the instantaneous phases of its input as well as the cosine (sine) of the sum of the instantaneous phases of its input. In the case of optical beating, the latter is removed due to the bandlimited nature of the balanced photodetector. Hence, there may be no need for the removal of the second order harmonics of the carrier signal from the output of the coherent detector by means of lowpass filters. Lowpass filtering may be required when applying this example to other non-optical technologies.

The first composite signal can be represented by Equation 8:

$$I = sqrt\left[M^2 + N^2\cos\left(2\pi f_1\left(\tau_0 - \frac{f_{d1}}{f_1}t\right) - \pi\alpha\left(\tau_0 - \frac{f_{d1}}{f_1}t\right)^2 + 2\pi\alpha\left(\tau_0 - \frac{f_{d1}}{f_1}t\right)t\right) + MN\cos(2\pi f_1 t + \pi\alpha t^2) + MN\cos(2\pi f_1(t-\tau) + \pi\alpha(t-\tau)^2)\right]\cos(2\pi f_c \tau)$$

and the second composite signal can be represented by Equation 9:

$$Q = sqrt\left[M^2 + N^2\cos\left(2\pi f_1\left(\tau_0 - \frac{f_{d1}}{f_1}t\right) - \pi\alpha\left(\tau_0 - \frac{f_{d1}}{f_1}t\right)^2 + 2\pi\alpha\left(\tau_0 - \frac{f_{d1}}{f_1}t\right)t\right) + MN\cos(2\pi f_1 t + \pi\alpha t^2) + MN\cos(2\pi f_1(t-\tau) + \pi\alpha(t-\tau)^2)\right]\sin(2\pi f_c t)$$

where $\tau_0$ represents the amount of time between the transmission of the LIDAR output signal and the receipt of the LIDAR input signal.

The Doppler frequency contained in the above signal components can be defined by equation 10:

$$f_{d1} = \frac{2v}{c} f_1.$$

To extract the amplitude of the beat signal and to remove its phase ($2\pi f_c \tau$), each of the above signals is multiplied by themselves and the results are added to obtain Equation 11:

$$h(t) = M^2 + 0.5N^2\cos\left(2\pi f_1(\tau_o - f_{d1}t/f_1) - \pi\alpha\left(\tau_o - \frac{f_{d1}}{f_1}t\right)^2 + 2\pi\alpha\left(\tau_o - \frac{f_{d1}}{f_1}t\right)t\right) + MN\cos(2\pi f_1 t + \pi\alpha t^2) + MN\cos(2\pi f_1(t-\tau) + \pi\alpha(t-\tau)^2)$$

The terms shown in bold in Equation 11 are small relative to the other terms and are ignored for the purposes of additional calculations. The underlined terms are not affected by the shift in frequency between the LIDAR output signal and the LIDAR input signal. The italicized terms may be approximated as shown in Equation 12: $MH \cos(2\pi f_1(t-\tau)+\pi\alpha(t-\tau)^2) \approx MN \cos(2\pi(f_1-(-f_{d1}+\alpha\tau_0))t+\pi\alpha t^2-2\pi f_1\tau_0)$ The underlined and italicized terms in equation 11 are removed by the filter 152. As a result, the beating data signal can be represented by Equation 13: $\text{flit}_{lowpass}(h(t)) \approx M^2+N^2 \cos(2\pi f_1\tau_0-2\pi f_{d1}t+2\pi\alpha\tau_0 t)$. As $f_{d1} \ll \alpha\tau_0$, the beating data signal of Equation 13 can be approximated by Equation 14: $\text{flit}_{lowpass}(h(t)) \approx M^2+N^2 \cos(2\pi f_1\tau_0+2\pi\alpha\tau_0 t)$. Equation 14 is not a function of the Doppler frequency $f_{d1}$.

Figure 7:
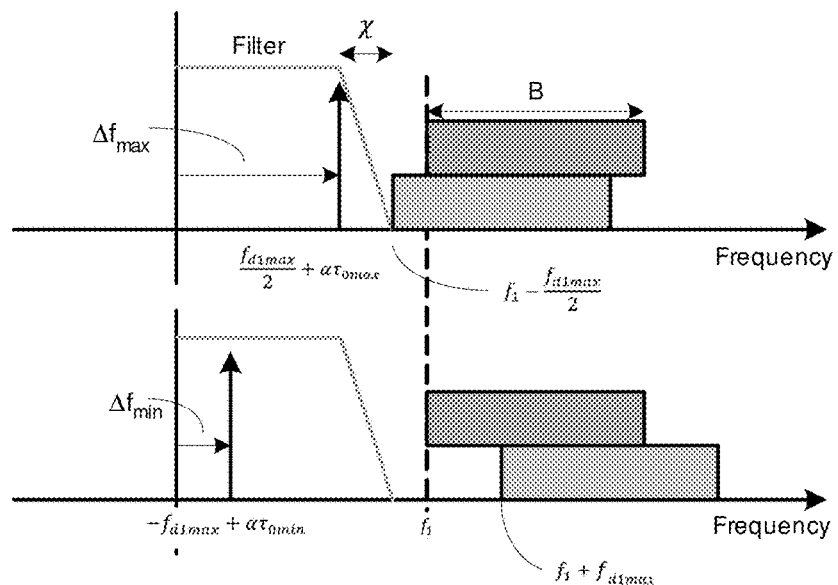
FIG. 7 illustrates various signal components as a function of frequency.

The bandwidth of the filter 152 and the modulation base frequency $f_1$ can be are determined such that the underlined and italicized terms in the above equations are removed. As the underlined terms are not affected by the shift in frequency between the LIDAR output signal and the LIDAR input signal, the position of its spectral components remain fixed as represented by the upper rectangle in FIG. 7. The beat frequency is determined by the shift frequency and varies in the following Equation 14:

$$-f_{d1max}+\alpha\tau_{0min} \leq -f_{d1}+\alpha\tau_0 \leq \frac{f_{d1max}}{2}+\alpha\tau_{0max}$$

where an up-ramp in the frequency of the amplitude chirp is assumed (i.e. c is positive) and $f_{d1max}$ is given by Equation 15:

$$f_{d1max} = \frac{2|v_{max}|f_1}{c}$$

where $|v_{max}|=2$ V and V represents the maximum radial velocity between reflecting object and the LIDAR chip. In the above equations, $f_{d1max}$ refers to the scenario where the target and the transmitter move towards each other with each at maximum speed V. The variations of the beat signal in the frequency domain are shown in 7 (i.e., the impulse) for the minimum and maximum frequency shifts.

The frequency components of the italicized terms in Equation 11 move with the frequency shift (the lower rectangle in the figure). Accordingly, the minimum bandwidth of the lowpass filter can be calculated so as to filter out the upper rectangle and the lower rectangle from FIG. 7 as provided by Equation 16:

$$BW_{filt} \geq \frac{f_{dmax}}{2}+\alpha\tau_{0max}$$

where $\tau_{0max}$ represents the maximum amount of time between the transmission of the LIDAR output signal and the receipt of the LIDAR input signal. The maximum is determined by the largest level for which the LIDAR system is to provide reliable results. Accordingly, the maximum is generally set the LIDAR specifications.

The base frequency for the chirp in the frequency of the amplitude modulation signal is also selected such that the underlined and italicized terms (i.e., the upper rectangle and the lower rectangle from FIG. 7) are filtered out. Consequently, $f_1$ can be determined from Equation 17: $f_1 \geq \chi+\alpha\tau_{0max}+f_{d1max}$ where $\chi$ is the width of the filter transition region. In one example for a filter 152 having a transition region of 50 MHz, with $f_1$ of about 300 MHz, a maximum expected distance between reflecting object and LIDAR chip of 200 m, a chirp of 400 MHz and a sample period duration of 2 microseconds where the chirp represents the change in the frequency of the chirp in the amplitude modulation signal during the duration of the sample period (labeled B above). In some instances, suitable values for $f_1$ include, but are not limited to, values greater than 100 MHz, 200 MHz, or 400 MHz and/or less than 600 MHz, 800 MHz, or 1 GHz.

Application of a real (as opposed to complex) Fast Fourier Transform (FFT) to the beating data signal generates an unambiguous solution for the range-induced frequency shift as the contribution of the Doppler frequency shift to the shift in frequency between the LIDAR output signal and the LIDAR input signal is negligible compared to the frequency shift due the distance of the reflecting object. As a result, the distance of the reflecting object from the LIDAR chip can be estimated based on the measured frequency shift using the following Equation 18:

$$RO = \frac{c\Delta f}{2\alpha}.$$

The sampling rate for the first period can cover a much smaller frequency shift and can be determined by Equation 19: $f_{s1} \geq 2\times\alpha\tau_{0max}$ where $f_{s1}$ represents the sample frequency during the first period.

The term $M^2$ in Equation 14 is a DC term. As the minimum expected range is unlikely to equal zero, the DC term should not be a concern. However, if for other practical reasons this term in undesirable, a bandpass filter instead of the lowpass filter can be used to remove this term.

During an example of a second period that serves as a velocity period, the radial velocity between the reflecting object and the LIDAR chip is determined. When the distance between the reflecting object and the LIDAR chip is already measured, this distance need not be determined from data generated during the second period.

In the second period, an up-ramp chirp can be added to the frequency of the amplitude modulation signal. However, by setting B=0, $\alpha$ goes to 0. By doing so, a frequency chirped LIDAR output signal can be replaced by LIDAR output signal where the frequency of the LIDAR output signal is not a function of time. For instance, the LIDAR output signal can be a continuous wave (CW). Since the frequency of the LIDAR output signal is not a function of time, the delay between transmitting the LIDAR output signal and receiving the LIDAR input signal is not a source of a shift in frequency of the LIDAR output signal relative to the LIDAR input signal. Accordingly, the LIDAR output signal can be represented as Equation 20: $S_{rx}(t)=\sqrt{P}\cos(2\pi f_n t)$ where $\sqrt{P}$ is the power of the LIDAR output signal. The LIDAR input signal can be represented by $S_{rx}(t)=(P\beta)^{1/2}\cos(2\pi f_c(t-\tau))$ where $\beta$ represents the attenuation.

The velocity data signal is generated as disclosed above and can be a complex signal represented by Equation 21: $g_1(t) \sim (P/2)\cos(2\pi f_c\tau_0-2\pi f_d t)+(j\ P/2)\sin(2\pi f_o\tau_o-2\pi f_d t)$. Equation 21 illustrates that the velocity data signal is only affected by the Doppler frequency shift. Furthermore, because of the complex nature of the velocity data signal, the Doppler shift may be unambiguously measured and the corresponding target velocity may be estimated.

By removing the frequency shift due to the distance between the reflecting object and the LIDAR chip from the LIDAR output signal used in the second period, the sampling rate for the second period need only cover the frequency shift due to a Doppler shift which can be represented by Equation 22: $f_{s2} \geq 2 \times f_{dmax}$ where $f_{s2}$ represents the sample frequency during the second period.

The sampling frequency used by the LIDAR system can be determined as $f_s \geq \max(2\alpha\tau_{0max}, 2f_{dmax})$.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the LIDAR chip including electronics that are integrated with the LIDAR chip.

Although the laser cavity is shown as being positioned on the LIDAR chip, all or a portion of the laser cavity can be located off the LIDAR chip. For instance, the utility waveguide 16 can terminate at a second facet through which the outgoing LIDAR signal can enter the utility waveguide 16 from a laser cavity located off the LIDAR chip.

The LIDAR chip can include components in addition to the illustrated components. As one example, optical attenuators (not illustrated) can be positioned along the first detector waveguide 36 and the second detector waveguide 38. The electronics can operate these attenuators so the power of the first portion of the composite signal that reaches the first light sensor 40 is the same or about the same as the power of the second portion of the composite signal that reaches the second light sensor 42. The electronics can operate the attenuators in response to output from the first light sensor 40 which indicates the power level of the first portion of the composite signal and the second light sensor 42 which indicates the power level of the second portion of the composite signal.

Embodiments of the LIDAR system are disclosed as generating different composite signals that each includes a portion of a reference signal and a portion of a comparative signal. The portions of the reference signal in the different composite signals are phase shifted relative to one another while the portions of the comparative signal in the different composite signals are not phase shifted relative to one another. However, the above results can also be achieved by generating the composite signals such that the portions of the comparative signal in the different composite signals are phase shifted relative to one another while the portions of the reference signal in the different composite signals are not phase shifted relative to one another.

The term radial velocity used above assumes a positive radial velocity when the reflecting object and the LIDAR chip are moving toward one another and negative radial velocity when the reflecting object and the LIDAR chip are moving away from one another.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a LIDAR chip having a waveguide configured to guide an outgoing LIDAR signal,
the LIDAR chip also configured to output a LIDAR output signal that includes light from the outgoing LIDAR signal,
the LIDAR chip also being configured to receive a LIDAR input signal,
the LIDAR chip including a signal combiner configured to combine a comparative signal with a reference signal so as to produce a composite signal beating at a beat frequency that is a difference between a frequency of the comparative signal and a frequency of the reference signal,
the comparative signal including light from the LIDAR input signal, and
the reference signal including light from the outgoing LIDAR signal and excluding light from the LIDAR input signal; and
electronics that calculate a distance between the LIDAR chip and an object that is moving with a radial velocity relative to the LIDAR system and that reflects the LIDAR output signal such that the LIDAR input signal includes light from the LIDAR output signal,
the electronics calculating the distance as $c*\Delta f/(2\alpha)$ where c represents a speed of light, $\Delta f$ represents the beat frequency, and $\alpha$ represents a rate of change in a frequency of the LIDAR output signal during the data period.

2. The system of claim 1, wherein the electronics operate the LIDAR system in a series of cycles that each has a distance period and a velocity period, the LIDAR output signal during each of the distance periods has a carrier signal with an amplitude modulated by an amplitude modulation signal that is a function of a sinusoid with a chirped frequency.

3. The system of claim 2, wherein during the distance periods a contribution of the radial velocity to the beat frequency is less than 10% of what the contribution to the beat frequency would be with LIDAR output signal replaced by a continuous wave with the same frequency as the LIDAR output signal.

4. The system of claim 3, wherein the LIDAR output signal during the distance periods has a carrier signal with an amplitude modulated by an amplitude modulation signal that is a function of a sinusoid with a chirped frequency.

5. The system of claim 3, wherein the LIDAR output signal generated during the distance periods can be represented by $[M+N*\cos(E+C*t+D*t^2)]^{1/2}\cos(F*t)$ where M, N, C, D, E and F are constants, t represents time, M>0, N>0, M$\geq$N, C$\neq$0, D$\neq$0, and F$\neq$0.

6. The system of claim 3, wherein the beat frequency is not a function of the radial velocity between the LIDAR chip and the reflecting object.

7. The system of claim 3, wherein during the velocity periods the electronics generate the LIDAR output signal as a continuous wave and use the LIDAR input signal that results from the continuous wave LIDAR input signal to determine the radial velocity between the LIDAR chip and the reflecting object.

8. The system of claim 2, wherein the composite signal during the distance periods is an in-phase component of a complex signal.

9. The system of claim 8, wherein the electronics perform a real transform Fourier transform on the complex signal so as to identify the beat frequency of the composite signal.

10. The system of claim 8, wherein a complex transform is performed on the complex signal.

11. The system of claim 2, wherein the LIDAR output signal is a continuous wave during the velocity periods.

12. The system of claim 1, wherein the electronics receive an electrical signal beating at the beat frequency from a balanced detector.

13. The system of claim 1, wherein the electronics include a transform component that performs a mathematical transform on the electrical signal and outputs the beat frequency.

14. The system of claim 1, wherein the LIDAR output signal is represented by $[M+N*\cos(E+C*t+D*t^2)]^{1/2}\cos(F*t)$ where M, N, C, D, E and F are constants, t represents time, $M>0$, $N>0$, $M \geq N$, $C \neq 0$, $D \neq 0$, and $F \neq 0$.

15. The system of claim 14, wherein $F>C$.

16. The system of claim 15, wherein F represents $2\pi f_c$ and C represents $2\pi f_1$ and a ratio of $f_c : f_1$ is greater than 2:1.

17. The system of claim 16, wherein the ratio of $f_c:f_1$ is greater than $5 \times 10^4$: 1.

18. The system of claim 15, wherein the LIDAR output signal is represented by $[M+N*\cos(E+C*t+D*t^2)]^{1/2}\cos(F*t)$ where M, N, C, D, E and F are constants, t represents time, $M>0$, $N>0$, and $M \geq N$, $C \neq 0$, $D \neq 0$, and $F \neq 0$.

19. The system of claim 18, wherein F represents $2\pi f_c$ and C represents $2\pi f_1$ and a ratio of $f_c:f_1$ is greater than $5 \times 10^4$:1.

20. A system, comprising:
a LIDAR system that includes a LIDAR chip having a waveguide configured to guide an outgoing LIDAR signal,
the LIDAR chip also configured to output a LIDAR output signal that includes light from the outgoing LIDAR signal,
the LIDAR chip also being configured to receive a LIDAR input signal,
the LIDAR chip including a signal combiner configured to combine a comparative signal with a reference signal so as to produce a composite signal beating at a beat frequency that is a difference between a frequency of the comparative signal and a frequency of the reference signal,
the comparative signal including light from the LIDAR input signal, and
the reference signal including light from the outgoing LIDAR signal and excluding light from the LIDAR input signal;
an object moving with a radial velocity relative to the LIDAR system and reflecting the LIDAR output signal such that the LIDAR input signal includes light from the reflected LIDAR output signal that was reflected by the object; and
the LIDAR system including electronics that calculate a distance between the LIDAR chip and the object as $c*\Delta f/(2\alpha)$ where c represents a speed of light, $\Delta f$ represents the beat frequency, and a represents a rate of change in a frequency of the LIDAR output signal during the data period.

* * * * *